United States Patent [19]

Kaye et al.

[11] Patent Number: 4,884,145
[45] Date of Patent: Nov. 28, 1989

[54] ALIGNMENT OF DOUBLE ECCENTRIC AIMING SYSTEM FOR SOLID STATE CAMERA

[75] Inventors: Seymour Kaye, Flushing; William R. Thompson, Malverne, both of N.Y.

[73] Assignee: Loral Corporation, Syosset, N.Y.

[21] Appl. No.: 948,258

[22] Filed: Dec. 31, 1986

[51] Int. Cl.$^4$ .................. H04N 9/097; G02B 7/02
[52] U.S. Cl. .................... 358/229; 358/225; 340/705; 350/247; 350/522
[58] Field of Search ................ 358/229, 225, 55, 101, 358/106, 107; 350/518, 522, 247, 252, 287; 340/705

[56] References Cited

U.S. PATENT DOCUMENTS

| | | | |
|---|---|---|---|
| 3,713,725 | 1/1973 | Uesugi | 350/247 |
| 4,277,804 | 7/1981 | Robison | 358/229 |
| 4,346,520 | 8/1982 | Moore | 33/180 R |
| 4,437,730 | 3/1984 | Pickett | 350/247 |
| 4,553,331 | 11/1985 | Salaam | 33/180 R |
| 4,568,972 | 2/1986 | Arents | 358/108 |
| 4,709,897 | 12/1987 | Mooney | 358/108 |
| 4,723,075 | 2/1988 | German | 250/231 SE |
| 4,734,778 | 3/1988 | Kobayashi | 358/229 |
| 4,743,763 | 5/1988 | Cutburth et al. | 250/239 |
| 4,772,109 | 9/1988 | Cutburth et al. | 350/531 |

FOREIGN PATENT DOCUMENTS 182878  9/1985  Japan .

Primary Examiner—James J. Groody
Assistant Examiner—Robert M. Bauer
Attorney, Agent, or Firm—Saidman, Sterne, Kessler & Goldstein

[57] ABSTRACT

An improved camera for recording stimuli received by the pilot of an aircraft. The camera features an improved mount for alignment of a charge-coupled device image forming element with respect to the housing of the camera. The improved mount comprises inner and outer eccentric adjustment members fitting within a bore in the camera housing. Each adjustment member comprises a cylindrical outer surface and a cylindrical bore, the axes of the cylindrical bores and cylindrical outer surfaces being parallel to but not coincident with one another, such that axial misalignment of an image forming element mounted on the inner adjustment member may be corrected by relative rotation of the adjustment members. Skew adjustment may also be provided. During assembly, the camera according to the invention is mounted on an alignment fixture bearing a predetermined relation to a target. A video image of the target provided by the image-forming element is displayed on a cathode ray tube display device for comparison to a reference image. The inner and outer adjustment members are rotated until the images are aligned, and are then locked. The aircraft contains a camera mount which is in fixed predetermined relation to an object which is to be imaged precisely.

7 Claims, 3 Drawing Sheets

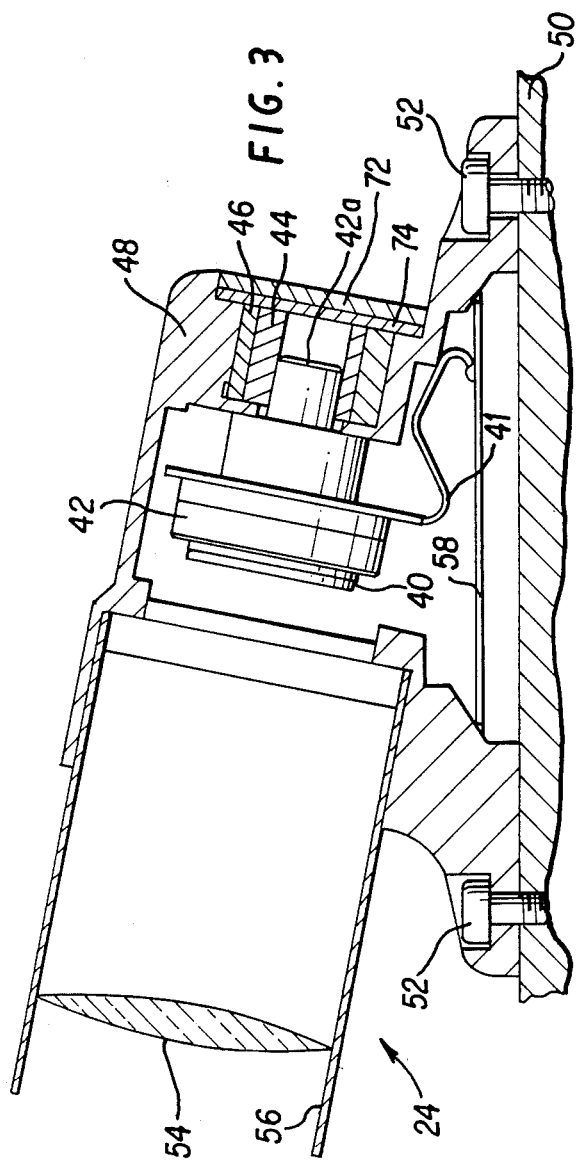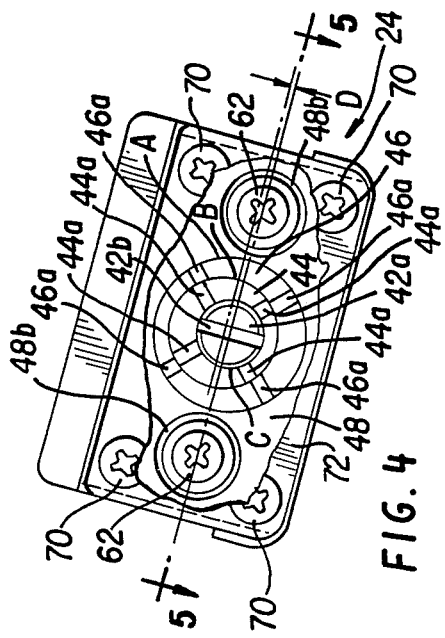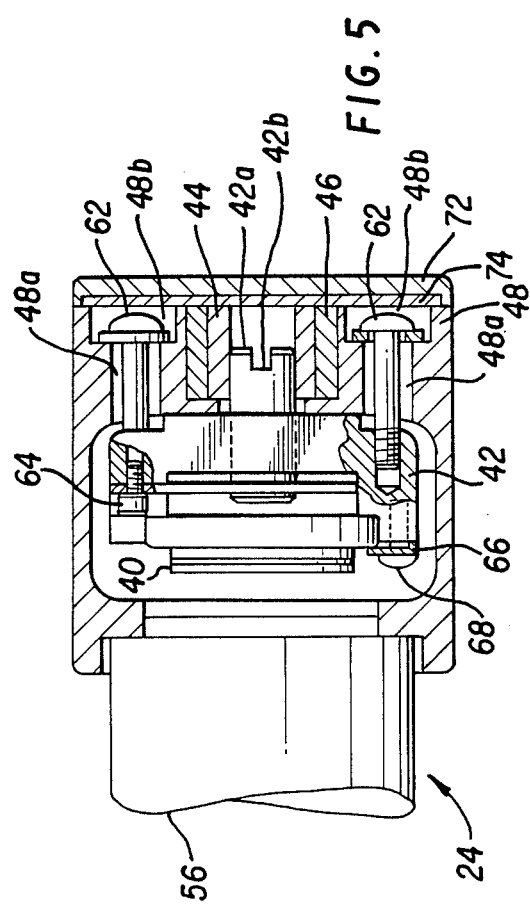

ALIGNMENT OF DOUBLE ECCENTRIC AIMING SYSTEM FOR SOLID STATE CAMERA

FIELD OF THE INVENTION

This invention relates to an accurate and readily adjustable mount for an optical device, particularly a mount for a solid state camera employing a charge coupled device (CCD) image forming element. More particularly, the invention relates to a mount for a CCD camera which permits the CCD image forming element to be very accurately aligned with respect to the camera housing at assembly, the alignment fixed, and the aligned camera and CCD element then affixed in position for use.

BACKGROUND OF THE INVENTION

Present day requirements for improved imaging devices place ever increasing demands on the accuracy of the alignment of cameras with respect to the objects to be viewed. Specifically, there is presently felt a need for a video camera for recording the visual stimuli received by the pilot of an aircraft, typically a fighter plane, for subsequent review for training purposes and/or in analysis of combat engagements. To be fully successful, the device recording the visual stimuli which the pilot sees must record what he sees with respect to the outside world, e.g. landing fields, other aircraft, aircraft carriers and the like, and must record the readings of the instruments which he can view. In the case of modern fighter aircraft, it is also desired that the pilot's movement of control and aiming devices for weaponry be accurately recorded.

It will be appreciated that aircraft are now being provided with "head up" instrument displays, in which holographic projections of certain instrument readings are provided superimposed over the pilot's field of view of the outside world, such that he does not have to look down to read the instruments. It is desired that these "head up" instrument readings be recorded as well.

To provide a complete and accurate record of what the pilot sees requires that the camera be very accurately aligned with respect to the airframe of the aircraft, that is, to its basic chassis. In particular, it is desired that this extreme accuracy of alignment of the camera with respect to the airframe be provided in connection with a camera which comprises a charge coupled device (CCD) image forming element.

SUMMARY OF THE INVENTION

The present invention satisfies the needs of the art referred to above by its provision of an improved alignment device for a solid-state camera. The camera comprises a housing which is adapted to be readily aligned with respect to an alignment fixture, for alignment of the camera in a laboratory prior to assembly, and for subsequent similar accurate alignment with respect to the airframe of the aircraft. Within the housing are disposed inner and outer eccentric adjustment members. The outer of the eccentric adjustment members is generally cylindrical in shape, and has a cylindrical bore formed therein. The axis of the cylindrical bore is parallel to that of the outer surface of the member but is displaced therefrom. The outer member fits into a bore in the housing. Within the cylindrical bore of the outer eccentric member is disposed the inner eccentric member. The inner eccentric member also comprises a cylindrical outer surface, sized to fit within the bore of the outer eccentric member, and has a cylindrical bore therein. Again, the axis of the cylindrical bore in the inner eccentric member is parallel to but displaced from the axis of its outer cylindrical surface. The imaging element, that is, the CCD element which forms the image, is then mounted on a cylindrical member fitting within the cylindrical bore of the inner eccentric member.

By relative manipulation of the inner and outer eccentric members on a test fixture in the laboratory, the CCD imaging element can be precisely aligned with respect to the locating means on the housing. The alignment of the eccentric members can then be fixed. When the camera is subsequently mounted on the air-frame, it will be accurately aligned with respect to the objects which are to be imaged.

BRIEF DESCRIPTION OF THE DRAWINGS

The invention will be better understood if reference is made to the accompanying drawings, in which:

FIG. 3 is a cross-sectional view of a camera including the improved alignment device according to the invention;

FIG. 4 is an end view of the camera of FIG. 3;

FIG. 5 is a partial sectional view taken along line 5—5 of FIG. 4; and

FIG. 6, comprising

DESCRIPTION OF THE PREFERRED EMBODIMENT

Figure 1:
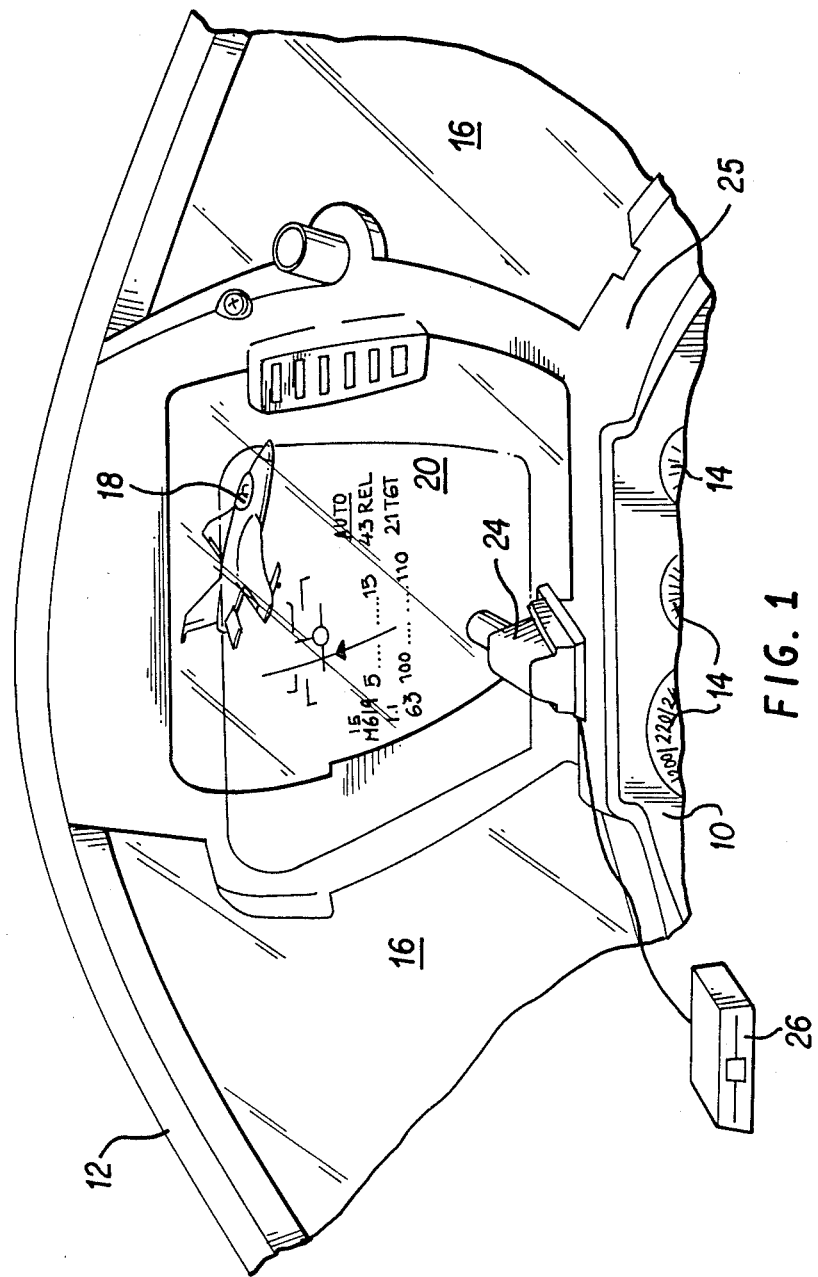
FIG. 1 shows a perspective view of the cockpit of an airplane, illustrating the use of a camera comprising the alignment device of the invention.

As described above, the art requires an accurately positioned camera which provides an essentially complete record of the visual stimuli available to the pilot of an aircraft. FIG. 1 illustrates a typical arrangement. A pilot piloting an aircraft 12 sees a view generally as shown in FIG. 1. The pilot has before him a number of instruments 14 on an instrument panel 10. He can see outside objects through a windscreen 16 such as, for example, another aircraft 18. Certain modern aircraft are now being fitted with "head up" displays in which crucial instrument readings and other data may be projected on a "combiner glass" 20 in front of the pilot's face.

According to one embodiment of the present invention, a camera 24 is mounted in a position that it can view the primary stimuli seen by the pilot, such as the head up display on glass 20, and outside objects in the such as the aircraft 18. The signal (typically a video signal) generated by the camera is recorded by a conventional recording device schematically indicated at 26. The recording device 26 may also record signals indicative of the pilot's response to the visual stimuli, such as weaponry control signals and the like, for subsequent analysis and training purposes.

In additional embodiments of the invention, the camera 24 may be positioned so that the image it forms includes the instruments 14. The response made by the pilot to the various stimuli may also be recorded by recorder 26 by arranging the camera 24 so that the image it forms includes the controls of the aircraft 12.

It is essential that the image formed by the camera be very accurate. In particular, the optical axis of the image forming element of the camera 24 must be precisely located with respect to the aircraft 12 such that the recorded image can be directly and objectively analyzed. It is possible to mount the camera 24 directly to the airframe 25 (that is, the basic structure of the airplane) as shown. It is also possible to manufacture the airframe 25 sufficiently accurately that accurately locating the housing of the camera 24 with respect to the airframe 25 will accurately define the relation of the optical axis of the camera 24 to the objects to be imaged. However, a significant possible source of inaccuracy relates to the positioning of the image forming device of the camera 24 with respect to the housing of the camera 24.

More specifically, it is desired to use a charge-coupled device (CCD) image forming element as the active element in the camera 24. As will be understood by those of skill in the art, the CCD image-forming element is essentially a semi-conductor chip which is very small. It is difficult to locate the CCD imaging device during assembly to the degree of accuracy required, which is generally within ± 0.0005 inches. More particularly, it is undesirable to oblige the aircraft manufacturer to align the image forming element to such a high degree of accuracy during the airplane manufacturing process. Instead a mounting structure is desired which provides precise and accurate alignment of a CCD imaging element with respect to the housing of a camera. The camera in turn is provided with locating means permitting its accurate alignment with respect to a target used for alignment during assembly and with respect to the airframe of an aircraft.

Figure 2:
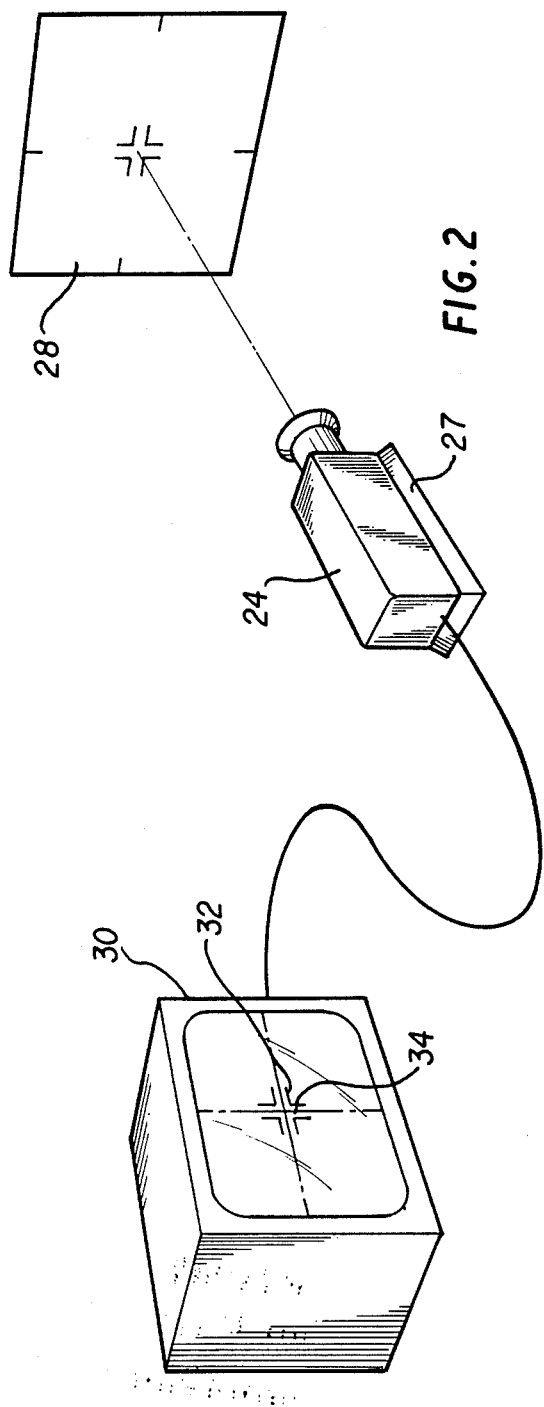
FIG. 2 shows a perspective view of the apparatus used for alignment of a camera comprising the device of the invention in a laboratory prior to assembly of the camera into an airplane.

FIG. 2 shows a perspective view of the arrangement employed for alignment of the charge-coupled device image forming element with respect to the housing of the camera. This process is performed upon manufacture of the camera, that is, in the laboratory of the camera manufacturer. The alignment of the image-forming element with respect to the housing of the camera is adjusted as needed until satisfactory, and is then fixed. When the camera is later assembled into the aircraft, the image forming element will automatically be correctly aligned with the airframe such that an accurate pictorial record of the visual stimuli seen by the pilot can be made.

FIG. 2 shows, as mentioned, the alignment arrangement. The camera 24 is disposed on an alignment fixture comprising a mount 27 in a position which is fixed with respect to an optical target 28, as illustrated. The camera 24 and mount 27 are accurately aligned by, for example, locating pins or screws (not shown), so that the position of the camera 24 with respect to the target 28 is defined. The same mounting arrangement is employed when the camera is later mounted in an aircraft. The camera's output is a video signal which is passed to a conventional cathode ray tube (CRT) display device 30. The image 32 of the target 28 appears on the screen of the display 30. The relative position of image 32 with respect to permanent crosshairs 34 printed or otherwise caused to appear on the screen of the display device 30 is used to determine any correction needed in the position of the CCD image forming element with respect to the housing of the camera 24. The improved alignment device according to the invention is then employed to gradually vary the position of the CCD element until comparison of the target image 32 on the display 30 with the permanent crosshairs 34 indicates that proper alignment has been obtained. When the correct alignment is obtained, it is made permanent. Thereafter, when the camera 24 is mounted on the air-frame 25, the charge-coupled image forming device will automatically be aligned with the objects to be imaged.

FIG. 3 shows a cross-sectional view of the camera 24, showing the improved CCD image forming element alignment device according to the invention. FIG. 4 shows an end view of the camera, and FIG. 5 is a partial cross-sectional view along line 5—5 of FIG. 4. The camera 24 of FIGS. 3, 4, and 5 comprises a CCD image forming element 40 which is mounted on a sensor mounting element 42. Sensor mounting element 42 is mounted within a first inner eccentric alignment member 44 which in turn is mounted within a second outer eccentric alignment member 46. The second outer eccentric alignment member 46 is mounted within the housing 48 of the camera 24. The housing 48 is fixed with respect to a fixed object 50, which may be an alignment fixture including an alignment mount 27 bearing a known predetermined relation to an optical target 28, used for alignment of the sensor 40 (FIG. 2), or the airframe 25 of an airplane (FIG. 1). The alignment of housing 48, which defines the optical axis of camera 24, is maintained with respect to object 50 by any of various means known to the art; in the example given in FIG. 3, screws 52 provide positive alignment of the housing 48 and the fixed object 50.

Also included as components of the camera 24 are a lens 54, shown only in exemplary form, and a lens housing 56. The camera may also comprise an electronics board 58 containing preamplifier circuitry and other desired electronic devices. Leads 41 connect the image forming element 40 to the circuitry on board 58. The image forming element 40 may be mounted on a printed circuit board.

Alignment of the center line of the CCD image forming element 40 with respect to the optical axis of the camera, and thus with respect to the fixed object 50, is accomplished by rotation of eccentric members 44 and 46 with respect to one another and to housing 48. When alignment has been achieved, which is determined as discussed in connection with FIG. 2, the relative positions of members 44 and 46 can be fixed by means of locking screws 62. As can be seen in FIGS. 3–5, locking screws 62 are threaded into the sensor mounting element 42. The body portions of screws 62 are smaller in diameter than holes 48a in housing 48 through which they pass, and their heads (and any surrounding washers) are smaller than recesses 48b in housing 48 in which the heads are located, so that lateral movement of the screws 62 with respect to the housing 48 is permitted. This allows lateral variation of the location of the CCD image forming element 40 with respect to the housing 48 during the adjustment process, so that the optical axes of the camera 24 and image element 40 can be aligned.

Rotational alignment of the CCD imaging element 40 with respect to the housing 48 is similarly effected by rotation of the mounting element 42. Any rotational skewing of the CCD element 40 will be visible on CRT 34 and can be corrected for during the alignment process, as depicted in FIG. 2.

When the correct alignment of the CCD element 40 is obtained, screws 62 are tightened, clamping the mounting element 42 to the housing 48 and making the lateral and skew alignment of CCD imaging element 40 with respect to housing 48 permanent.

As can be observed from FIGS. 4 and 5, sensor mounting element 42 comprises a cylindrical portion 42a which fits in a bore within the inner adjustment member 44, which in turn fits within a bore in the outer adjustment member 46, which in turn fits within a bore formed in the housing 48. As shown, the inner and outer adjustment members 44 and 46 are eccentric. That is, the axes of the bores formed within them are parallel to but not coaxial with the axes of their cylindrical outer surfaces. Therefore, one can adjust the relative orientation of the CCD element 40 mounted on the sensor mounting element 42 with respect to the housing 48 by rotating the inner and outer members 44 and 46. By virtue of the fact that two eccentric adjustment members are provided, one can adjust the position of the CCD array with respect to the housing 48 in orthogonal directions, that is, in both the left and right and the up and down directions, as seen in FIG. 4. In order to aid in the relative rotation of the inner and outer adjustment members, and in holding one still while rotating the other, spanner slots 44a and 46a are provided, as shown, for insertion of spanner wrenches.

Skew adjustment, if needed to correct an angular inaccuracy of the CCD element 40, which shows up as an angular misalignment of the target image 32 on the cathode ray tube 30 with respect to the fixed crosshairs 34, is accomplished by turning the sensor mounting element 42. This is conveniently accomplished by means of a screwdriver slot 42b formed in the cylindrical portion 42a of sensor mounting element 42.

The dimensions of the housing 48, the inner and outer alignment members 44 and 46, and the cylindrical portion 42a of the sensor mounting member 42 must all cooperate with one another. Thus, as shown in FIG. 4, the inner diameter of the bore in the housing 48 is the same (a small clearance being provided to allow relative movement thereof) as the outer diameter of the outer eccentric member 46, as indicated at A. The diameter of the bore in the outer eccentric adjusting member 46 is the same as the outer diameter of the inner adjustment member 44, as indicated at B, a clearance being provided. Finally, the diameter of the bore in the inner adjustment member 44 is the same as the diameter of the cylindrical portion 42a of the sensor mounting member 42, as indicated at C, a clearance again being provided.

The amount of the eccentricity provided may be chosen in accordance with the degree of accuracy of positioning of the CCD element 40 with respect to the element mounting member 42. A useful eccentricity for both eccentric alignment members is provided by 0.016" misalignment of the axes of the bores and outer surfaces of the members 44 and 46, dimension D in FIG. 4. Applicant finds that using the alignment device of the invention it is possible to adjust the accuracy of alignment of the CCD imaging element 40 such that the video image provided is accurate to one picture element ("pixel") in both horizontal and vertical dimensions. This represents the maximum image accuracy possible in a video-based system.

It will be appreciated that the axes of the bores and of the cylindrical surfaces of the adjusting members 44 and 46 and the array mounting element 42 must all be parallel to one another for accurate alignment to be possible. In effect, the centerline of the CCD image forming element 40 must be parallel to the axes of the cylindrical members 42 and 46, in order that it can coincide with the optical axis of camera 24. In general, sufficient parallelism will be achieved when the CCD element 40 is mounted on an end of the sensor mounting member 42 which has been machined flat. In the same manner it can be ensured that the active surface of the CCD imaging element 40 is in the focal plane of lens 54.

FIG. 5 shows details of the mounting of the CCD imaging element 40 to the sensor mounting element 42. As indicated, the sensor mounting element 42 may be built up of several parts held together by screws 64. The CCD imaging element 40 can be assembled to the mounting element 42 by a bezel 66 retained by screws 68.

FIGS. 3-5 also illustrate a cover 72 which may be assembled to the housing 48 by screws 70 after the alignment process has been completed. A gasket 74 may be interposed between cover 72 and housing 48 to seal the housing 48 after assembly and alignment.

Figure 6C:
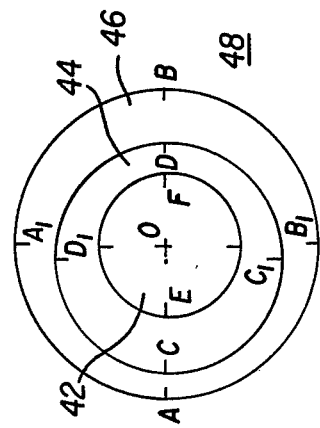
FIGS. 6a through c, shows schematically stages in the alignment of the image forming element with the optical axis of the camera.
Figure 6B:
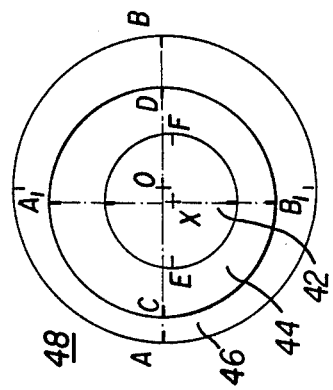
Figure 6A:
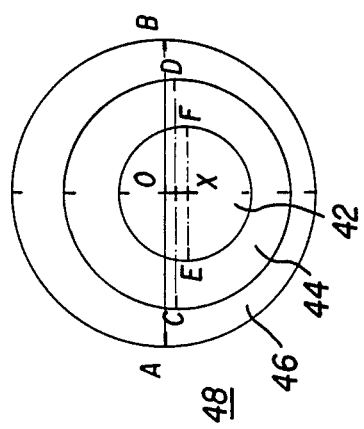

FIG. 6, comprising FIGS. 6a-6, shows schematically the steps in alignment of the centerline of the CCD imaging element 40 with the optical axis of the camera 24. The housing 48 defines the optical axis of the camera 24, which thus bears a specified predetermined relation to a fixed object 50 to which the camera 24 is affixed, which may be an alignment mount 27 provided for initial alignment of the CCD array 40 in an assembly operation as in FIG. 2, or the airframe 25 of an aircraft as in FIG. 1.

FIG. 6a gives an example of misalignment of the array. The optical axis of the camera is indicated at O. That is, point O bears a specified physical relationship to the fixed object 50 which may, for example, be the airframe 25 of an aircraft. The optical axis of the image-forming CCD array, however, is shown at X in FIG. 5a. The outer eccentric adjusting member 46 is then rotated 90° clockwise, while the inner adjustment member 44 and the array mounting element 42 are held still, to arrive at the position shown in FIG. 6b. Point A on the outer member 46 thus arrives at point $A_1$ of FIG. 6b; point B has similarly been rotated to point $B_1$.

As can be seen, point X, the axis of the CCD array 40, is still misaligned with respect to the optical axis O of the camera 24 and hence to the mounting structure 50. To correct this misalignment, the inner eccentric adjustment member 44 is now rotated 90° counterclockwise to arrive at the position shown in FIG. 6c, in which points O and X coincide, indicating alignment of the CCD element 40 with respect to the housing 48. Points C-D, indicating the alignment of inner eccentric adjustment member 44, are thus rotated to locations $C_1$, $D_1$ of FIG. 6c. Again, this is performed without movement of the other members of the assembly.

Throughout the alignment process, points E-F which indicate the alignment of the CCD imaging element 40 and of the sensor mounting element 42 remain unchanged, indicating that the element does not rotate during the lateral alignment process just described. The imaging element 40 may be rotated by rotating sensor mounting element 42, if needed to correct for skew error. As described, the adjustment of the relative position of the CCD element 40 with respect to the optical axis of the camera 24 which is required is determined by monitoring their relative positions as shown on the screen of cathode ray tube 30 of the laboratory alignment arrangement shown in FIG. 2.

It will be appreciated that there has been described a mount for an imaging device which provides extremely subtle alignment of the image forming element with respect to the optical axis of the device. This in turn allows correct orientation of the element with respect to a fixed object, such as the airframe 25 of an aircraft. In this manner, the correct alignment of the CCD element 40 with respect to objects the images of which are to be accurately recorded can be readily and conveniently ensured. By doing so, the record made by recorder 26 of the visual stimuli received by the pilot will be accurate and will provide a superior teaching or analytical tool.

As mentioned, the camera 24 according to the invention can be positioned to image the controls of the aircraft, to record the pilot's response to the stimuli seen. The record made may also include a record of signals derived from the aircraft's control circuitry to record the pilot's control actions.

Further, it will be recognized that the inventive mount for an imaging device permits very precise alignment to be made in a laboratory, that is, upon manufacture of the camera 24, which can then be readily affixed to the airframe 25 without the requirement of additional adjustment or alignment. This simplifies the assembly process for aircraft manufacture, and also simplifies replacement of the camera 24 in the aircraft should that be necessary for some reason.

It will be appreciated further that while the invention has been described in connection with the mounting of a CCD imaging element with respect to the optical center line of a camera comprising a lens, the invention can be used in connection with the mounting of other image-forming devices or optical elements with respect to other optical elements or objects to be imaged, for example. Accordingly, the application should not be limited by the specific use of the mount of the invention which has been described herein.

Finally, while a preferred embodiment of the invention has been described, this should not be taken as a limitation upon its scope, which is to be limited only by the following claims.

I claim:

1. An apparatus for aligning an image-forming optical element with respect to an object to be imaged, comprising:
    (a) a housing comprising alignment means for permitting adjustment of the relative positions of an element mounting member and said housing, said alignment means comprising inner and outer eccentric adjustment members, each of said adjustment members comprising an outer cylindrical surface and a bore, the axes of said cylindrical surfaces and bores of said adjustment members being parallel to but not coaxial to one another, said element mounting member having a cylindrical surface fitting within said bore of said inner eccentric adjustment member, and said housing comprising a cylindrical bore for receiving said outer eccentric adjustment member,
    (b) means for fixably mounting said image forming optical element to said element mounting member,
    (c) means for mounting said housing on an alignment mount in predetermined relation to an optical target,
    (d) means for operating said image-forming optical element to display an image of said optical target,
    (e) means for adjusting the position of said optical element with respect to said housing and said alignment mount by varying the relative angular positions of said inner and outer eccentric adjustment member relative to the housing until said image of said optical target indicates that said element is properly aligned,
    (f) means for locking said optical element with respect to said housing; and
    (g) means for mounting said housing on a second mount in predetermined relation to said object to be imaged.

2. The apparatus of claim 1 wherein said image-forming optical element is a charge-coupled device image formation element.

3. The apparatus of claim 2 in further combination with means for recording an image formed by said image forming optical element.

4. The apparatus of claim 1 wherein said alignment means further comprises skew adjustment means for correction of angular error in the position of the image forming optical element relative to the object to be imaged.

5. A method for the aligning of an image-forming optical element with respect to an object to be imaged, comprising the steps of:
    (a) providing a housing comprising alignment means for permitting adjustment of the relative positions of an element mounting member and said housing, said alignment means comprising inner and outer eccentric adjustment members, each of said adjustment members comprising an outer cylindrical surface and a bore, the axes of said cylindrical surfaces and bores of said adjustment members being parallel to but not coaxial to one another, said element mounting member having a cylindrical surface fitting within said bore of said inner eccentric adjustment member, and said housing comprising a cylindrical bore for receiving said outer eccentric adjustment member,
    (b) fixedly mounting said image-forming optical element to said element mounting member,
    (c) mounting said housing on an alignment mount in predetermined relation to an optical target,
    (d) operating said image-forming optical element to display an image of said optical target,
    (e) adjusting the position of said optical element with respect to said housing and said alignment mount by varying the relative angular positions of said inner and outer eccentric adjustment members relative to the housing until said image of said optical target indicates that said element is properly aligned
    (f) locking said optical element with respect to said housing, and
    (g) mounting said housing on a second mount in predetermined relation to said object to be imaged.

6. The method of claim 5 wherein said adjusting step (e) further includes the steps of comparing the displayed image of said optical target with a reference image, and varying the relative positions of said inner and outer eccentric adjustment members relative to the housing until said images are axially aligned.

7. The method of claim 6 further including the step of adjusting the angular position of said image-forming optical element to obtain angular alignment of said displayed image with respect to said reference image.

* * * * *